Figure 1:
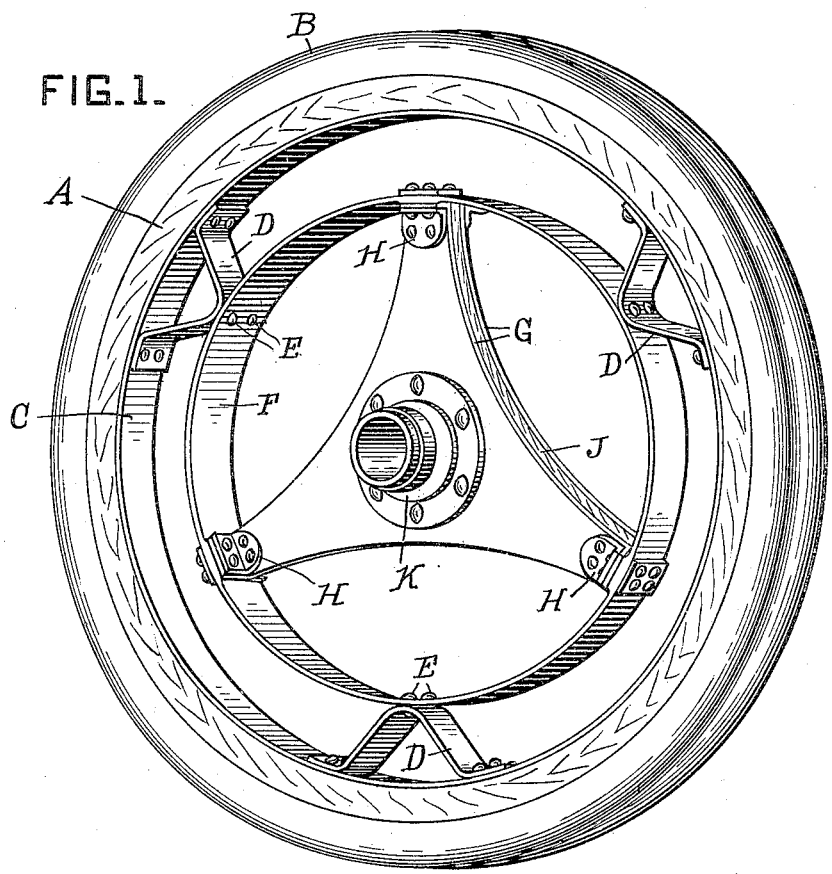

B. P. COOPER.
WHEEL.
APPLICATION FILED NOV. 5, 1910.

1,103,398.

Patented July 14, 1914.

2 SHEETS—SHEET 1.

WITNESSES:

INVENTOR

B. P. COOPER.
WHEEL.
APPLICATION FILED NOV. 5, 1910.

1,103,398.

Patented July 14, 1914.
2 SHEETS—SHEET 2.

WITNESSES:

INVENTOR

UNITED STATES PATENT OFFICE.

BENSON P. COOPER, OF ITHACA, NEW YORK.

WHEEL.

1,103,398.

Specification of Letters Patent. Patented July 14, 1914.

Application filed November 5, 1910. Serial No. 590,865.

*To all whom it may concern:*

Be it known that I, BENSON P. COOPER, residing at Ithaca, in the county of Tompkins and State of New York, a citizen of the United States, have invented or discovered certain new and useful Improvements in Wheels, of which improvements the following is a specification.

The invention which forms the subject of my present application for Letters Patent is an improvement in that class of vehicle wheels designed and constructed to constitute a resilient running support for vehicles generally, but more especially for heavier vehicles, such as automobiles, propelled cabs or trucks, tram cars, and the like.

It has heretofore been proposed to secure the ultimate object attained by my improvement, by the use with rigid wheels of highly resilient tires generally inflated with air, or by wheels which in general terms may be defined as comprising a rigid felly and an elastic or resilient connection between the felly and the central hub, usually as would be effected by the use of springs in some form as a substitute for the ordinary spoke.

The use of resilient tires, now universal, while effective in a high degree in absorbing the shocks due to the irregularities of road surface, involve so much expense and care that it has long been an incentive to the invention of some substitute in the nature of an elastic wheel, but it is a well recognized fact that up to the present time no commercially practicable form of wheel of this character has been devised, or at least has found its way into general use.

My improvement, in the best and most practicable form of which I am aware, is characterized by the following features: a rigid felly of any suitable construction and provided with a tire which may be elastic or may simply serve to deaden the impact on the pavement and increase the tractive effect of the wheels. A curved resilient band normally concentric with the felly forms the resilient member of the wheel and is secured within the felly to inwardly projecting supports which are radially maintained in any suitable manner. The supports are so constructed *e. g.* rounded, where they are connected to the band, that when flexed adjacent to the supports a sharp bend or kink will not be formed. A hub member consisting of a central portion in which the bearing for the axle is secured and radially projecting arms or spokes. The hub member is so constructed that the arms or spokes are radially maintained and are capable of positively transmitting stresses to and from the spring member or band whether such stresses are applied in directions parallel with or at right angles to the axis of the wheel. As the strains or stresses are transmitted by or applied to the ends of the spokes or arms they should be so constructed or braced that under such strains there should be little if any change in their radial relations. This bracing can be conveniently attained by forming the radial members integral with the axle bearing and with each other at their inner ends or portions adjacent to the axle bearing. By increasing the width of the spokes or arms from the outer ends inwardly, they will have the general appearance of a series of isosceles triangles having their bases connected or integral with each other and with the axle bearing. It is evident that by giving the bases sufficient spread in the direction of the axis of the wheel the sides of the triangles will brace the outer ends of the arms or spokes as against stresses or strains in any direction.

It is preferred for the sake of lightness that the hub member consisting of the central body and the spokes radiating therefrom, should be made of a filling of wood and outside metal plates all securely bolted or clamped together. Such a wheel I have found to be more effective in absorbing the shocks and jars incident to the running of a heavy vehicle over rough roads, than the most approved forms of pneumatic tire wheels; to be very much more economical in use; and to be entirely free from objections to those forms of so called spring wheels which have heretofore been proposed.

Figure 2:
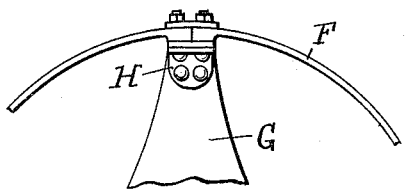
Figure 3:
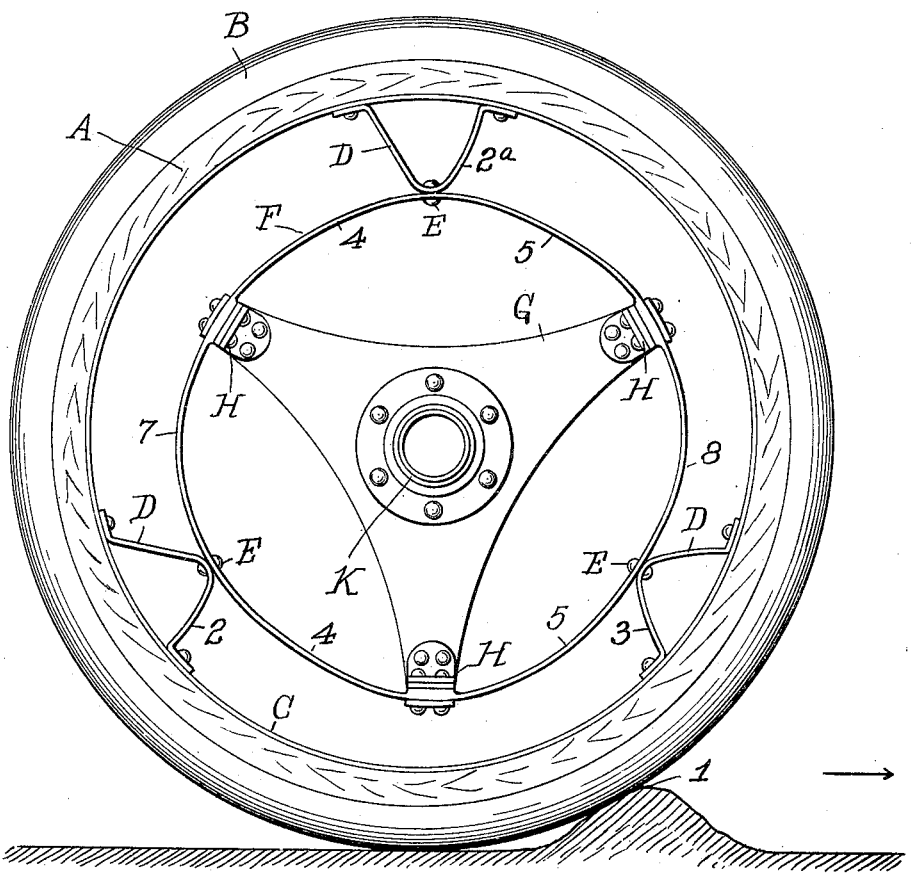

By reference to the annexed drawings, Figure 1 shows the preferred form of the invention in perspective, Fig. 2 is a detail view showing the manner of connecting the band to the spokes, and Fig. 3 shows the wheel when striking an obstruction as a stone.

A designates a rigid wooden felly provided with a solid but elastic cushioning tire or tread B and an inner metal facing C. The supports or members D which serve to connect the felly with the resilient member or band F, are by preference made substantially V shaped and are riveted or bolted to the felly preferably at equal intervals, the bolts or rivets passing through flanges on the free ends of the legs. This construction is light and will have sufficient rigidity as to be practically unyielding to any strain or stress within the resilient limit of the band, but will yield after the resistance of the band is exhausted, and will radially maintain their point of attachment to the band. To the rounded ends of the supports "D" is secured in any suitable manner, preferably by lines of bolts or rivets "E," a comparatively thin steel band "F" and within this latter the hub member, which preferably consists of a pair of metal plates "G" with three equi-distant points or extensions "H," is secured to the band or resilient member "F" at points substantially midway between the points of connection of the band to the supports "D." The plates "G" have bolted between them a wooden block or filling piece "J," and carrying a bearing "K" for receiving an axle. These details of construction may be varied greatly, as by the modification in the form of said metal plate or plates and in the means for securing the same to the resilient member, provided that the points of attachment of the band to the hub member, be maintained in substantially the same positions relative to each other under any strains which may be applied in directions parallel with or at right angles to the axis of the wheel i. e. under cushioning and dishing strains. In other words, for the proper operation of the device, there should be no permanent change in the position of the three points of support of the band "F" relative to each other, and similarly no change in the relative positions of the three points of connection between the band "F" and the hub member, such as would occur or tend to occur with unbraced spokes radiating from a central hub. To prevent such changes of position, there should be used some form of bracing or tying, such as is afforded by the construction shown.

In practice I have found that to reduce the tendency to any shearing or kinking action, the points or apices of the supports of the band "F," should be slightly rounded, and I also prefer, for the same purpose, to thicken the band where they are attached to the hub members, as shown. When thus constructed the band comprises, virtually six resilient sections. The material for the band should be well tempered steel, and of a thickness and width suitable to give the best results, the dimensions varying with the weight of the car, its load and other conditions well known in the art.

As will be readily understood any stresses tending to dish the wheel, will operate to twist the portions of band between the points of attachment to the hub member, so that the band will absorb not only shocks operating in directions at right angles to its axis, but also dishing strains operating in directions parallel with its axis.

From observations of my improved wheels in use, there appears to be a tendency of the resilient sections of band "F" to straighten out, or give the band an approximately hexagonal form under severe stresses; but aside from the theories as to the principles of operation, it is manifest that the stresses are distributed in a remarkably perfect manner and that the device possesses to a high degree the necessary properties of a rigid structure and at the same time of a shock absorber.

It has been ascertained by actual use that the resilience of the wheel is due to a very great extent to the straightening out of the portions of the sections of the band between the points of attachment to the supports and the hub members and to a small degree to inward flexure of the resilient band. This will be readily understood if it be supposed that a blow or pressure be applied at the point 1. The felly being rigid, it will move upward as a whole relative to the hub member, carrying with it the supports at 2 2ª and 3. This upward movement of the supports will exert a pull on the sections 4 and 5 of the band tending to straighten the same and pulling up the hub member so that the inward flexure of the sections on opposite sides of the support will be slight. The portions 7 and 8 of the band will be subjected to some compression but the direction of such compression will tend to force the hub member upward. From the foregoing statement of the actual operation of the wheel, it will be seen that the hub member to which the band is applied is resiliently hung within the rigid felly and that the inward flexure and compression of some of the sections will be limited by the straightening of the sections under tension. It will be apparent that as soon as the sections under tension have been straightened that the hub member and felly will move together and there cannot be any further inward flexure or compression of any of the other members.

I have shown and described the wheel herein as having three equi-distant points of support on the felly for the resilient band and three intermediate points of connection between said band and the hub element, but this is typical only of an odd number of such supports and connections. Three points for ordinary purposes are sufficient and suitable, but I may use any other number depending on the diameter of the wheel and the degree of resiliency desired, as well as the weight or load which the wheel is to sustain.

The connection from the band to the axle bearing should be so constructed as to practically transmit stresses from the hub to the band and vice versa without material deformation or yielding until the resilience of the band has been exhausted, it being characteristic of my improved wheel that the band is the principal source of resilience in the wheel.

It is characteristic of my improved wheel that strains or stresses are transmitted whether parallel with or at an angle to the axis of the wheel directly and positively from the hub and the felly to the resilient member of the wheel.

I claim herein as my invention:

1. In a vehicle wheel, the combination of a non-resilient felly, an inner concentric spring band, equi-distant intermediate supporting devices connected to the band and felly and formed as braces to meet stresses exerted circumferentially, an axle-bearing at the center of the spring band, and a hub member connected to the axle-bearing and to the spring band at points intermediate the supporting devices and constituting a bracing between its points of connection with the band to withstand stresses in directions substantially at right angles to the axis of the wheel.

2. In a vehicle wheel, the combination of a non-resilient felly, an inner concentric spring band, an odd number of equi-distant intermediate supporting devices connected to the spring band and the felly and formed as braces to meet stresses exerted circumferentially, an axle bearing at the center of the spring band, and a hub member connecting the axle bearing and the spring band at points intermediate of the supporting devices and constituting a bracing between its points of connection with the band to withstand stresses in directions substantially at right angles to the axis of the wheel.

3. In a vehicle wheel, the combination of a non-resilient felly, a concentric spring band, intermediate diagonally braced members connected to the felly and the band whereby to meet circumferential stresses, a hub member having triangular extensions connected to the spring band at points intermediate the braced members, and an axle bearing carried at the center of the spring band by the hub member.

4. In a vehicle wheel, the combination with a rigid felly and a hub element, of a concentric spring band intermediate the felly and hub element, and secured to the latter and supporting members for the band between the same and the felly consisting of metal plates bent to V-shape with rounded apices, fastened at their bases to the felly and at their apexes to the spring band, as set forth.

5. In a vehicle wheel the combination of a rigid felly, a hub member, and a resilient band connected at alternate intervals to the felly and hub member and forming a resilient suspension member for supporting the hub within the felly, the points of connection of the band to the felly and hub member being rigid as against strains within the resilient limit of the band.

6. In a vehicle wheel the combination of a rigid felly, a hub member, and a resilient band connected to the hub member and at intermediate points yieldingly connected to the felly, and forming a resilient member for supporting the hub within the felly, the points of connection of the band to the felly being circumferentially maintained as against strains within resilient limit of the band.

In testimony whereof, I have hereunto set my hand.

BENSON P. COOPER.

Witnesses:
  BERT T. BAKER,
  HERMAN J. FRANTZ.

---

Copies of this patent may be obtained for five cents each, by addressing the "Commissioner of Patents, Washington, D. C."